United States Patent
Steltner et al.

(10) Patent No.: US 12,292,136 B2
(45) Date of Patent: May 6, 2025

(54) PROCESS VALVE APPARATUS AND METHOD

(71) Applicant: Festo SE & Co. KG, Esslingen (DE)

(72) Inventors: Holger Steltner, Esslingen (DE); Matthias Joachimsthaler, Karlsruhe (DE); Jürgen Ruoff, Stuttgart (DE)

(73) Assignee: Festo SE & Co. KG, Esslingen (DE)

( * ) Notice: Subject to any disclaimer, the term of this patent is extended or adjusted under 35 U.S.C. 154(b) by 403 days.

(21) Appl. No.: 17/844,922

(22) Filed: Jun. 21, 2022

(65) Prior Publication Data

US 2022/0412482 A1     Dec. 29, 2022

(30) Foreign Application Priority Data

Jun. 23, 2021   (DE) ...................... 10 2021 206 492.2

(51) Int. Cl.
*F16K 37/00*    (2006.01)
*F15B 19/00*    (2006.01)

(52) U.S. Cl.
CPC ........ *F16K 37/0083* (2013.01); *F15B 19/005* (2013.01); *F16K 37/0091* (2013.01)

(58) Field of Classification Search
CPC . F16K 37/0083; F16K 37/0091; F15B 19/005
See application file for complete search history.

(56) References Cited

U.S. PATENT DOCUMENTS

| | | | | |
|---|---|---|---|---|
| 9,046,185 B2* | 6/2015 | Kiesbauer | ............. | F15B 19/005 |
| 9,080,683 B2* | 7/2015 | Carter | ................... | G05B 19/46 |
| 9,611,873 B2* | 4/2017 | Junk | ..................... | F15B 19/005 |
| 10,316,988 B2* | 6/2019 | Junk | ..................... | F15B 19/002 |
| 10,480,681 B2* | 11/2019 | Junk | ..................... | F15B 15/066 |
| 2017/0184215 A1 | 6/2017 | Junk | | |
| 2019/0310157 A1* | 10/2019 | Reich | ...................... | G01L 27/02 |
| 2020/0096132 A1* | 3/2020 | Fassbender | ......... | F16K 31/1635 |
| 2023/0324857 A1* | 10/2023 | Joachimsthaler | ..... | F15B 19/005 |
| 2024/0060574 A1* | 2/2024 | Steltner | ............... | F16K 37/0033 |
| 2024/0200689 A1* | 6/2024 | Steltner | ............... | F16K 37/0091 |

FOREIGN PATENT DOCUMENTS

| | | |
|---|---|---|
| DE | 199 46 871 | 1/2001 |
| WO | 2010/010315 A1 | 1/2010 |
| WO | 2011/135155 A1 | 11/2011 |
| WO | 2016/149590 A1 | 9/2016 |

OTHER PUBLICATIONS

Finnish Office Action of Mar. 31, 2023.
Finnish Search Report of Mar. 31, 2023.

* cited by examiner

*Primary Examiner* — Octavia Hollington
(74) *Attorney, Agent, or Firm* — Hoffmann & Baron, LLP

(57) ABSTRACT

A process valve apparatus includes a process fitting, a pneumatic valve drive and a control device with a control unit. The control device is configured to carry out a partial stroke test. The control unit is configured to control a valve device of the control device with an electrical control signal in order to effect a pneumatic actuation of the valve drive. The control device is configured to perform a plurality of partial stroke tests and the control unit is configured to provide the electrical control signal with the same control signal values for each partial stroke test.

17 Claims, 5 Drawing Sheets

PROCESS VALVE APPARATUS AND METHOD

BACKGROUND OF THE INVENTION

The invention relates to a process valve apparatus, comprising: a process fitting with a valve member, a pneumatic valve drive for actuating the valve member, and a control device with a pneumatic valve device for pneumatically actuating the valve drive, the control device being configured to carry out a partial stroke test and, within the partial stroke test, to actuate the valve drive pneumatically by means of the valve device, so that the valve drive sets the valve member in a test movement sequence in which the valve member performs a first test movement from a first position to a second position and a second test movement from the second position to the first position.

SUMMARY OF THE INVENTION

It is an object of the invention to increase the safety of the process valve apparatus.

The object is solved by a process valve apparatus according to claim 1. The control device of the process valve apparatus is configured to detect pressure information related to the pneumatic actuation of the valve drive during the partial stroke test and to determine, taking into account the pressure information, status information indicating the functioning and/or the wear of the process valve apparatus.

By taking the pressure information into account, the status information can be determined more reliably. This means that a higher level of safety can be achieved.

The pressure information comprises, for example, a drive pressure of the valve drive and/or a pressure variable determined in particular from the drive pressure, which pressure variable is expediently characteristic for the start or the course of the first test movement and/or the second test movement.

For example, the pressure information comprises as a pressure variable a first breakaway pressure value at which the first test movement starts, a second breakaway pressure value at which the second test movement starts, a maximum drive pressure value in the time from an initiation of the first test movement to the end of the first test movement, a minimum drive pressure value in the time from an initiation of the first test movement to the end of the first test movement, a maximum drive pressure value in the time from an initiation of the second test movement to the end of the second test movement, and/or a minimum drive pressure value in the time from an initiation of the second test movement to the end of the second test movement.

The invention further relates to a method.

BRIEF DESCRIPTION OF THE DRAWINGS

An exemplary embodiment is explained below with reference to the figures. Thereby shows.

DETAILED DESCRIPTION

Figure 1:
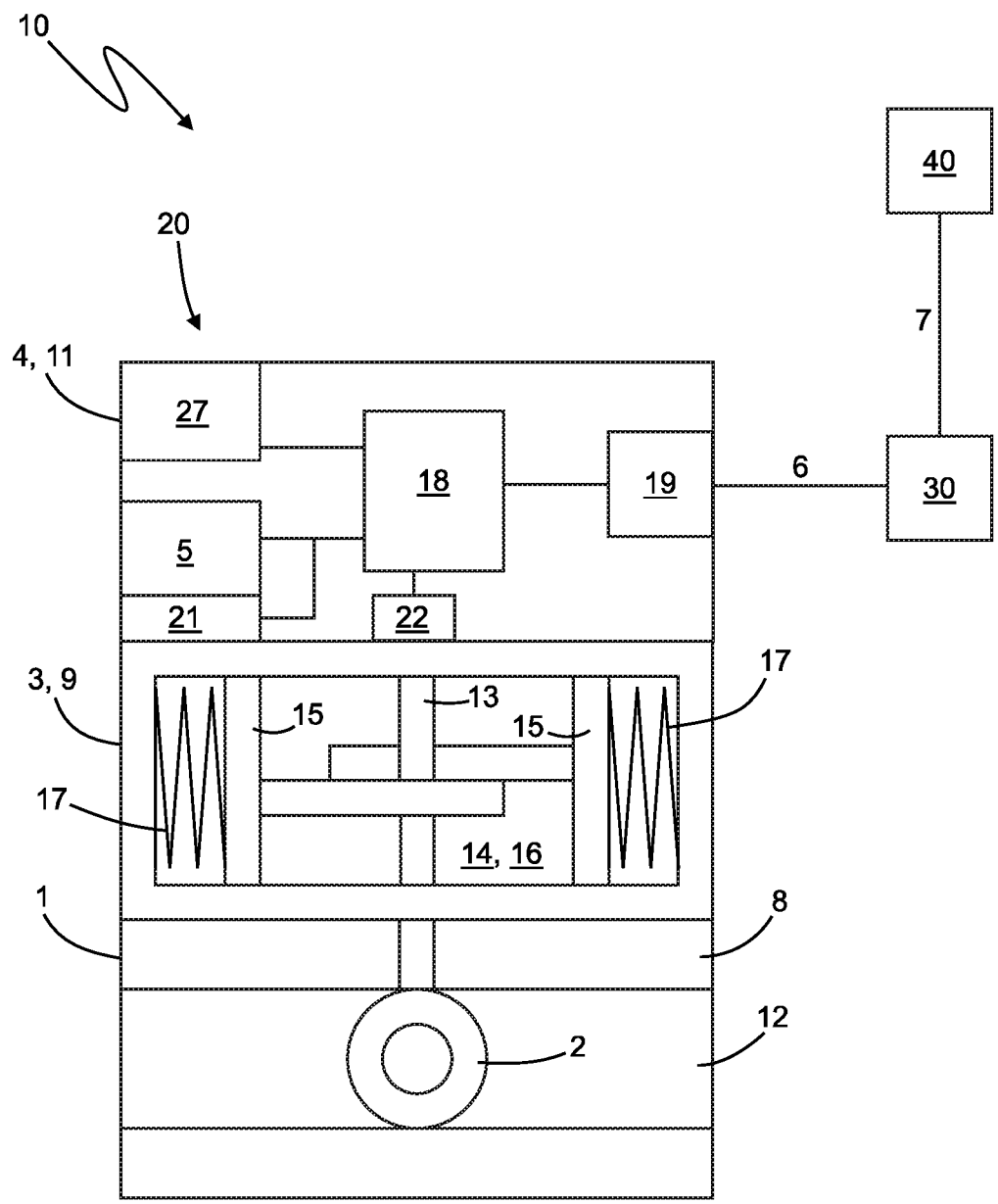
FIG. 1 a schematic representation of a process valve apparatus.

FIG. 1 shows a process valve apparatus 10, which exemplarily comprises a process valve assembly unit 20, a higher-level controller 30 and/or a cloud server 40. The process valve assembly unit 20 is exemplarily connected to the higher-level controller 30 via a communication line 6, in particular a field bus. The higher-level controller 30 is exemplarily connected to the cloud server 40 via a wide-area network 7, for example the Internet.

According to a possible embodiment, the process valve assembly unit 20 may be connected via a gateway, in particular an IOT gateway, and/or directly to the cloud server.

The process valve apparatus 10 is for use in process automation. Preferably, the process valve apparatus 10 serves to influence a flow of a process fluid.

The process valve apparatus 10 comprises a process fitting 1 with a valve member 2, a pneumatic valve drive 3 for actuating the valve member 2, and a control device 4 with a pneumatic valve device 5 for pneumatically actuating the valve drive 3.

Exemplarily, the process valve assembly unit 20 is formed by the process fitting 1, the valve drive 3, and the control device 4. For example, the process fitting 1 has a process fitting housing 8, the valve drive 3 has a valve drive housing 9, and the control device 4 has a control device housing 11. The valve drive housing 9 is attached to the process fitting housing 8, and the control device housing 11 is attached to the valve drive housing 9. Exemplarily, the valve drive housing 9 is attached with its bottom side to the top side of the process fitting housing 8 and the control device housing 11 is attached with its bottom side to the top side of the valve drive housing 9.

In an exemplary embodiment, the process fitting housing 8 is tubular and defines a process fluid channel 12 that guides the process fluid. The valve member 2 is arranged in the process fluid channel 12 to control the flow of the process fluid, in particular to selectively block or open it.

The valve drive 3 has a drive element 13 which is coupled to the valve member 2 so that the position of the valve member 2 can be changed by means of a drive movement, in particular a drive rotary movement, of the drive element 13. The valve drive 3 further has a piston arrangement 15, via which the drive element 13 can be set in the drive movement.

The valve drive 3 has at least one pressure chamber arrangement 14 which can be pneumatically actuated by the valve device 5 in order to set the drive element 13 in the drive movement. The pneumatic actuation is effected by supplying and/or discharging compressed air into/out of the pressure chamber arrangement 14. A drive pressure is set in the pressure chamber arrangement 14 by the pneumatic actuation. Preferably, the valve device 5 comprises one or more pneumatic valves, by means of which the actuation of the valve drive 3 takes place. Exemplarily, the pressure chamber arrangement 14 comprises a first pressure chamber 16 to which compressed air can be supplied and discharged via the valve device 5.

The valve drive 3 is preferably single-acting, so that the pressure chamber arrangement 14 expediently has only one pressure chamber—the first pressure chamber 16. The first chamber pressure prevailing in the first pressure chamber 16 provides a drive force which (via the piston arrangement 15 and the drive element 13) urges the valve member 2 in the direction towards a first position x1. The aforementioned drive pressure is exemplarily the first chamber pressure. The first position x1 is exemplarily a first end position of the valve member 2, in particular an end position in which the valve member 2 opens the process fluid channel 12. Expediently, the valve drive 3 has a spring element 17 that provides a restoring force that (via the piston arrangement 15 and the drive element 13) urges the valve member 2 in a direction away from the first position x1. Expediently, the restoring force urges the drive element 13 into a second end position, in which the valve member 2 blocks the process fluid channel 12.

According to an alternative embodiment not shown, the valve drive has a second pressure chamber and expediently does not have the spring element 17. The valve drive is exemplarily double-acting. In this alternative embodiment, the drive pressure is exemplarily the differential pressure—i.e. the pressure difference—between the first pressure chamber and the second pressure chamber.

The control device 4 is preferably designed as a closed-loop position controller or as a positioner. The control device 4 exemplarily comprises a control unit 18, which is designed in particular as a microcontroller, and/or a communication unit 19, which is used in particular for communication with the higher-level controller 30 and/or with the cloud server 40.

The control device 4 comprises the valve device 5 and is configured to supply compressed air into the pressure chamber arrangement 14 by means of the valve device 5 and/or to release compressed air from the pressure chamber arrangement 14 by means of the valve device 5 in order to set the drive pressure.

The control device 4 expediently further comprises a pressure sensor device 21 and is configured to detect the drive pressure by means of the pressure sensor device 21. Expediently, the control device 4 is configured to detect the first chamber pressure prevailing in the first pressure chamber 16 by means of the pressure sensor device 21. In a double-acting version of the valve drive, the pressure sensor device 21 is expediently also designed to detect a second chamber pressure prevailing in the second pressure chamber of the valve drive.

The control device 4 expediently further comprises a position sensor device 22 and is configured to detect an actual position of the valve member 2 by means of the position sensor device 22, for example by detecting the position of the drive element 13, from which the position of the valve member 2 can be inferred.

It is expedient that the higher-level controller 30 issues a control command to the control device 4, in particular via the communication line 6. The control command specifies, for example, a target position for the valve member 2. The control device 4 is preferably designed to perform a closed-loop position control of the valve member 2 on the basis of the control command. For this purpose, the control device 4 compares the actual position detected via the position sensor device 22 with the target position specified by the control command and, on the basis of the comparison, adjusts the drive pressure by means of the valve device 5 in such a way that the actual position changes towards the target position.

It is expedient that the control device 4 is configured to carry out, in a normal operation, the closed-loop position control of the valve member 2 on the basis of the target position specified by the (external) higher-level controller 30. Furthermore, the control device 4 is configured to switch from the normal operation to a partial stroke test operation (explained in more detail below) and, in the partial stroke test operation, to perform the closed-loop position control of the valve member 2 on the basis of a target position signal generated in particular internally by the control device 4 (and not on the basis of the target position specified by the higher-level controller 30). In particular, the control device 4 is configured to ignore the target position specified by the higher-level controller 30 in partial stroke test operation—i.e. while the partial stroke test is being performed.

Exemplarily, the process valve apparatus 10 further comprises an operating device 27. The operating device 27 comprises in particular an operating element, for example one or more keys, and optionally a display. Exemplarily, the operating device 27 is part of the process valve assembly unit 20, in particular of the control device 4. Furthermore, the operating device 27 can also be provided as a device separate from the process valve assembly unit 20, in particular as a mobile device, for example as a smartphone or tablet, or as a computer.

The control device 4 is configured to perform the partial stroke test. The control device 4 is configured to pneumatically actuate the valve drive 3 by means of the valve device 5 within the partial stroke test, so that the valve drive 3 sets the valve member 2 in a test movement sequence in which the valve member 2 performs a first test movement from a first position x1 to a second position x2 and performs a second test movement from the second position x2 back to the first position x1. The control device 4 is further configured to detect pressure information related to the pneumatic actuation of the valve drive 3 within the partial stroke test and to determine, taking into account the pressure information, status information indicating the functioning and/or the wear of the process valve apparatus 10.

Preferably, the control device 4 performs a closed-loop position control of the valve member 2 during the partial stroke test.

The control device 4 is configured to control the valve device 5 with an electrical control signal 25 in order to effect the pneumatic actuation of the valve drive 3. The electrical control signal 25 is generated in particular by the control unit 18. The valve device 5 is controlled by the control device 4 in particular by the control unit 18 controlling the valve device 5 with the electrical control signal 25.

The valve device 5 supplies or discharges compressed air to the pressure chamber arrangement 14, in particular the first pressure chamber 16, in accordance with the electrical control signal 25. The valve device 5 is expediently configured to selectively connect, on the basis of the electrical control signal 25, the pressure chamber arrangement 14, in particular the first pressure chamber 16, to a compressed air source via a first valve device opening in order to supply compressed air to the pressure chamber arrangement 14, in particular the first pressure chamber 16, or to connect it to a compressed air sink via a second valve device opening in order to discharge compressed air from the pressure chamber arrangement 14, in particular from the first pressure chamber 16. The electrical control signal 25 specifies the degree of opening of the first valve device opening and the degree of opening of the second valve device opening. In response to a positive control signal value of the electrical control signal 25, the valve device 5 blocks the second valve device opening and adjusts the degree of opening of the first valve device opening according to the magnitude of the control signal value. In response to a negative control signal value, the valve device 5 blocks the first valve device opening and sets the degree of opening of the second valve device opening according to the magnitude of the control signal value.

The first position x1 is, as mentioned above, expediently an end position of the valve member 2 in which the valve member releases the process fluid channel 12. The second position x2 is expediently a position in which the process fluid channel 12 is closed further than in the first position x1, but in which the process fluid channel 12 is not yet blocked—i.e. in which the process fluid can continue to flow through the process fluid channel 12.

Figure 2:
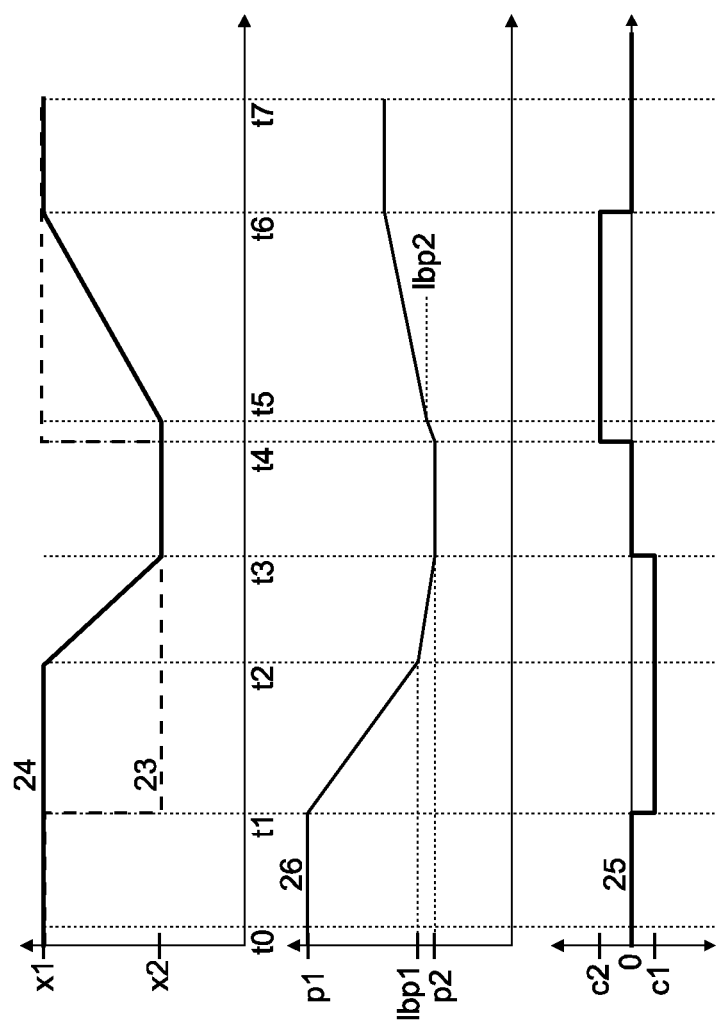
FIG. 2 diagrams of a time sequence of a partial stroke test.

FIG. 2 shows three diagrams illustrating the time sequence of an exemplary partial stroke test.

The upper diagram shows the time curves of a target position signal 23 (as dashed line) and the detected actual position 24 of the valve member 2 during the partial stroke test. The maximum value of the target position signal 23 indicates the first position x1. The middle diagram shows the time curve of the drive pressure 26 during the partial stroke test. The lower diagram shows the time curve of the control signal 25 during the partial stroke test.

The valve member 2 is initially in the first position x1. At time t1, the process valve apparatus 10 changes the target position signal 23 from a first target position signal value indicating the first position x1 to a second target position signal value indicating the second position x2. The target position signal 23 is provided, for example, by the control unit 18. Based on the target position signal 23, and in particular further based on the detected actual position 24, the process valve apparatus 10 generates the electrical control signal 25. Exemplarily, in response to the target position signal 23 being less than the actual position 24, the process valve apparatus 10 generates the control signal 25 with a first control signal value c1 that is negative. The first control signal value c1 causes the valve device 5 to discharge air from the pressure chamber arrangement 14, in particular the first pressure chamber 16, so that the drive pressure 26 is reduced. Exemplarily, the drive pressure 26 reduces continuously from the first time t1 to the third time t3.

The actuation with the control signal 25 by which actuation the first test movement is to be effected shall also be referred to as the first actuation. The first actuation starts exemplarily at the first time t1, in particular by changing the control signal 25 from zero to the first control signal value c1.

At the second time t2, the drive pressure 26 is low enough so that the valve member 2 starts to move from the first position x1 to the second position x2. The value of the drive pressure 26 at which the valve member 2 starts to move—i.e. at which the first test movement starts—shall also be referred to as the first breakaway pressure value lbp1.

From the second time t2 to the third time t3, the valve member performs the first test movement from the first position x1 to the second position x2.

At the third time t3, the actual position 24 reaches the second position x2 specified by the target position signal 23. In response to the fact that the actual position 24 is equal to the second position specified by the target position signal 23, the process valve apparatus 10 sets the control signal 25 to zero, so that the compressed air present in the pressure chamber arrangement 14, in particular in the first pressure chamber 16, is trapped there.

At time t4, the process valve apparatus 10 changes the target position signal 23 from the second target position signal value indicating the second position x2 to the first target position signal value indicating the first position x1. Exemplarily, in response to the target position signal 23 being greater than the actual position 24, the process valve apparatus 10 generates the control signal 25 with a second control signal value c2 that is positive. The second control signal value c2 causes the valve device 5 to admit air into the pressure chamber arrangement 14, in particular the first pressure chamber 16, so that the drive pressure increases. Exemplarily, the drive pressure increases continuously from the fourth time t4 to the sixth time t6.

The actuation with the control signal 25, by which actuation the second test movement is to be effected, shall also be referred to as second actuation. The second actuation starts exemplarily at the first time t4, in particular by changing the control signal 25 from zero to the second control signal value c2.

At the fifth time t5, the drive pressure is high enough so that the valve member 2 starts to move from the second position x2 towards the first position x1. The value of the drive pressure at which the valve member 2 starts to move—i.e. at which the second test movement starts—shall also be referred to as the second breakaway pressure value lbp2.

From the fifth time t5 to the sixth time t6, the valve member 2 performs the second test movement from the second position x2 to the first position x1.

At the sixth time t6, the actual position 24 reaches the first position x1 specified by the target position signal 23. In response to the fact that the actual position 24 is equal to the first position x1 specified by the target position signal 23, the control unit 18 sets the control signal 25 to zero, so that the compressed air present in the pressure chamber arrangement 14, in particular in the first pressure chamber 16, is trapped there.

As mentioned above, the control device 4 is configured to detect, during the partial stroke test, pressure information related to the pneumatic actuation of the valve drive 3 and to determine, taking into account the pressure information, state information indicating the functioning and/or wear of the process valve apparatus 10.

Preferably, the status information indicates whether there is a restriction on the mobility of the valve member 2.

The pressure information comprises, for example, a value of the drive pressure detected in particular by the pressure sensor device 21 during the partial stroke test (i.e. in particular between the time t0 and the time t7), for example a minimum drive pressure value, a maximum drive pressure value, the first breakaway pressure value lbp1, the second breakaway pressure value lbp2 and/or a rate of change of the drive pressure, in particular in a time range between a first change of the drive pressure up to the start of the respective test movement—i.e. exemplarily in the time range from the time t1 to the time t2 and/or in the time range from the time t4 to the time t5.

Preferably, the control device 4 is further configured to take time information into account when determining the state information. The time information comprises, for example, a time interval from a start of an actuation of the valve device 5 until the position of the valve member 2 to be effected by the actuation is reached. For example, the time information comprises a first time interval from the time t1 to the time t3 and/or a second time interval from the time t4 to the time t6.

Optionally, the time information further comprises a first change time period from the start of an actuation of the valve device 5 to effect the first test movement to a change in the drive pressure caused by this actuation, in particular detectable by the pressure sensor device 21, and/or a second change time period from the start of an actuation of the valve device 5 to effect the second test movement to a change in the drive pressure caused by this actuation, in particular detectable by the pressure sensor device 21.

Expediently, the control device 4 has one or more reference values of the pressure information, in particular one or more of the aforementioned values of the pressure information, and/or the time information, in particular one or more of the aforementioned values of the time information, and is configured to determine the state information on the basis of a comparison of the one or more reference values with the pressure information and/or the time information.

Preferably, the process valve apparatus 10 has a waiting time parameter that defines a waiting time and is designed to wait the waiting time defined by the waiting time parameter each time the first position x1 and/or the second position x2 is reached before the process valve apparatus 10 changes the target position signal 23 and/or the control signal 25 in order to move the valve member 2 to the respective other position x1, x2. This achieves that the valve member 2 remains in each of the positions assumed in the partial stroke test for at least the waiting time defined by the waiting time parameter. Preferably, the waiting time defined by the waiting time parameter is greater than zero. Alternatively, the waiting time defined by the waiting time parameter can also be equal to zero, so that the process valve apparatus 10 immediately begins to cause a movement towards the next position after the respective desired position has been reached.

Figure 3:
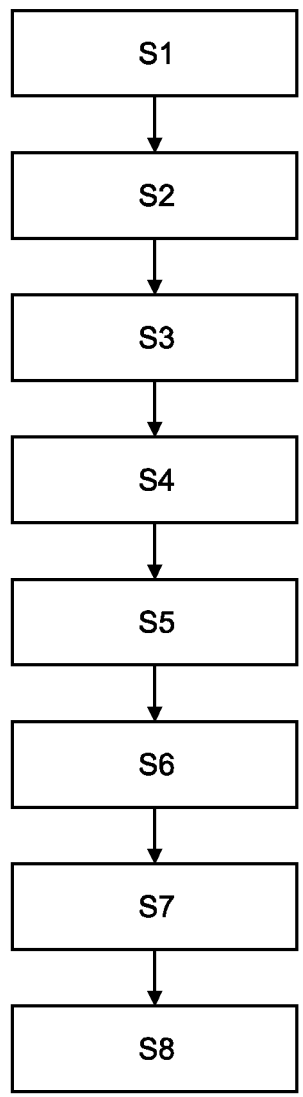
FIG. 3 a flow chart of the partial stroke test with waiting times.

FIG. 3 shows a flow chart of an exemplary sequence of the partial stroke test taking into account the waiting time parameter.

At step S1, the process valve apparatus 10 starts the partial stroke test. For example, the process valve apparatus 10 generates a partial stroke test start signal by which the start of the partial stroke test is indicated. Exemplarily, the start of the partial stroke test occurs at the time t0 drawn in FIG. 2.

In step S2, the process valve apparatus 10 moves the valve member 2 to the first position x1. If the valve member 2 is already in the first position x1, the process valve apparatus 10 maintains the first position x1 during step S2.

In response to the valve member 2 being in the first position x1, the process valve apparatus performs step S3 in which the process valve apparatus 10 waits for a first waiting time defined by the waiting time parameter. In FIG. 2, the first waiting time starts at time t0 and ends at the first time t1.

In response to the expiration of the first waiting time in step S3, the process valve apparatus starts to effect the movement towards the second position x2 in step S4. This is done by changing the target position signal 23 and the control signal 25 at time t1 as already explained above.

In response to the valve member 2 reaching the second position x2, the process valve apparatus performs step S5, in which the process valve apparatus 10 waits for a second waiting time defined by the waiting time parameter. In FIG. 2, the second waiting time starts at the third time t3 and ends at the fourth time t4.

In response to the expiration of the second waiting time in step S5, the process valve apparatus starts to effect the movement towards the first position x1 in step S6. This is done by changing the target position signal 23 and the control signal 25 at time t4 as already explained above.

In response to the valve member 2 reaching the first position x1, the process valve apparatus 10 performs step S7, in which the process valve apparatus 10 waits for a third waiting time defined by the waiting time parameter. In FIG. 2, the third waiting time starts at the sixth time t6 and ends at the seventh time t7.

In response to the expiration of the third waiting time at step S7, the process valve apparatus 10 terminates the partial stroke test at step S8.

Preferably, the first waiting time, the second waiting time, and/or the third waiting time is each greater than or equal to 1 s, 5 s, or 10 s.

Preferably, the first position x1, the second position x2 and/or the waiting time parameter can be entered into the process valve apparatus 10 by a user, in particular by means of the operating device 27.

Preferably, the control device 4 is configured to perform a plurality of partial stroke tests and to provide the electrical control signal with the same control signal values for each partial stroke test. In particular, the control device 4 provides the electrical control signal with the same first control signal value c1 and the same second control signal value c2 for each partial stroke test.

In particular, the control device 4 is configured to set the electrical control signal to the constant first control signal value c1 during the entire first test movement of the valve member 2 and/or to set the electrical control signal to the constant second control signal value c2 during the entire second test movement of the valve member 2. The control signal thus expediently remains constant at the first control signal value c1 during the entire first test movement and/or constant at the second control signal value c2 during the entire second test movement. Exemplarily, the electrical control signal comprises exclusively square-wave pulses, each of which has the first control signal value c1 or the second control signal value c2 as signal value. Preferably, the control device 4 determines the control signal value only on the basis of the desired direction of movement of the valve member 2 and keeps the control signal value constant during the movement of the valve member 2.

The magnitude of the first control signal value c1 is expediently different from the magnitude of the second control signal value c2. In particular, the magnitude of the first control signal value c1 is smaller than the magnitude of the second control signal value c2.

The control device 4 is preferably designed to perform two-point closed-loop control or three-point closed-loop control, in particular asymmetrical two-point closed-loop control or asymmetrical three-point closed-loop control, for the closed-loop position control of the valve member 2 during the partial stroke test. In particular, the control device 4 is designed to set only three (or four) different control signal values—exemplarily the first control signal value c1, the second control signal value c2 and the control signal value zero (and optionally the preparation control signal value cv1 explained below)—from the time t1 from which the valve member 2 moves out of the first position x1 during the partial stroke test until the end of the partial stroke test.

Preferably, the first control signal value and/or the second control signal value can be entered into the process valve apparatus 10 by a user, in particular by means of the operating device 27.

Preferably, the control device 4 is adapted to perform a control signal value determination procedure and, within the control signal value determination procedure, to detect a movement parameter of the valve member 2 and to determine control signal values of the control signal to be used for the partial stroke test based on the movement parameter.

For example, the control device 4 is configured to perform the control signal value determination procedure as part of a system initialization. For example, in the control signal value determination procedure, the control device 4 detects a maximum speed of the valve member 2 for a respective direction of movement as a movement parameter, in particular together with a control signal value used for this purpose. Furthermore, in the control signal value determination procedure, the control device 4 detects as a movement parameter, for example, a change time period measured at a control signal value between a start of an actuation of the valve device 5 and a change in the drive pressure (in particular caused by the actuation). Furthermore, in the control signal value determination procedure, the control device 4 detects as a movement parameter one or more system parameters that were determined as part of a model identification.

Preferably, the control device 4 is configured to determine, in particular to calculate, the control signal values on the basis of the movement parameter, taking into account a specification of a movement duration for the valve member 2. The specification of the movement duration is carried out, for example, by a user, in particular by means of the operating device 27. The determined control signal values are provided, in particular, as proposed values. For example, the determined control signal values are adopted as default values for the partial stroke test after system initialization.

Optionally, the control device 4 has a link between the control signal values and movement times of the valve member 2. The link is based in particular on a previously identified system model. The control device 4 is expediently configured to indicate to the user an effect of a change in a control signal value (in particular entered by the user) on a movement time of the valve member 2 and/or to indicate an effect of a change in a movement time (in particular entered by the user) on a control signal value (required for this movement time).

It is expedient that the control device 4 is configured to determine, on the basis of a previous actuation of the valve device 5, a control signal value, which at the beginning of the partial stroke test causes the valve member 2 to move out of the first position x1 only after a predetermined number of detection cycles in which the pressure information is detected. In particular, the control device 4 determines the control signal value in such a way that the control signal value causes a sufficiently rapid change in the drive pressure without the breakaway pressure being reached within too few detection cycles. An detected cycle is a cycle in which the pressure information, the status information and/or the safety information is acquired.

Preferably, the control device 4 is configured to determine safety information in addition to the status information. The safety information indicates whether the execution of the partial stroke test is safe. Preferably, the control device 4 is configured to abort the partial stroke test in response to the safety information indicating that the execution of the partial stroke test is not safe. The safety information indicating that the performance of the partial stroke test is not safe shall also be referred to as the first safety information. The safety information indicating that it is safe to perform the partial stroke test shall also be referred to as the second safety information.

As explained in more detail below with reference to FIG. 4, the control device 4 is preferably configured to determine the safety information on the basis of the pressure information and/or on the basis of a temporal quantity related to the test movement sequence of the valve member 2.

Figure 4:
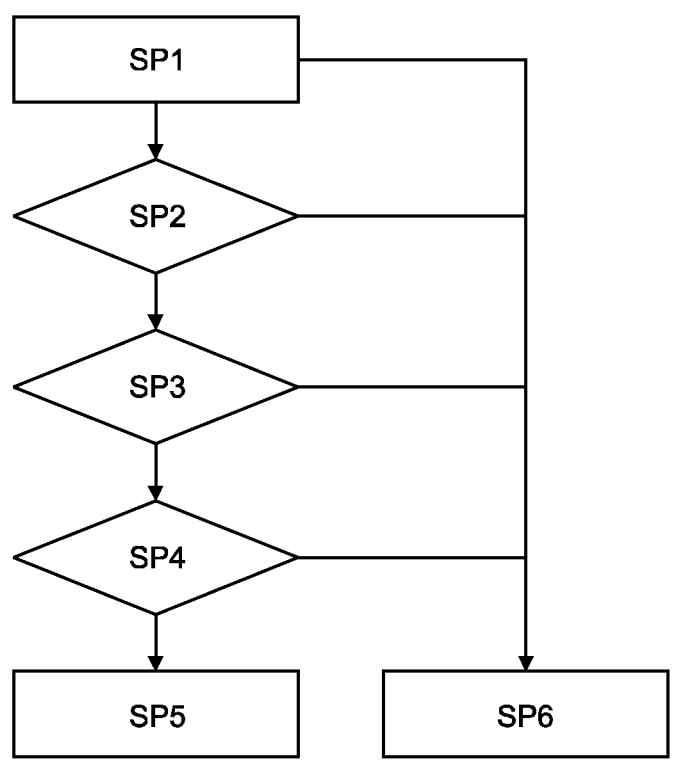
FIG. 4 a flowchart of a safety procedure.

FIG. 4 shows a flowchart of an exemplary safety procedure expediently executed by the control device 4 to determine the safety information.

The safety procedure serves in particular to prevent the valve member 2 from moving too much during the partial stroke test, i.e. in particular to prevent the valve member 2 from moving beyond the second position x2.

The safety procedure is expediently part of the partial stroke test. In particular, the control device 4 is configured to start the safety procedure automatically when performing the partial stroke test. For example, the control device 4 is configured to start the safety procedure in response to the partial stroke test start signal. In particular, the control device 4 is configured to perform the safety procedure for each partial stroke test. Preferably, the control device 4 performs the safety procedure in each of the steps of the partial stroke test sequence shown in FIG. 3.

As explained below, the safety procedure expediently comprises a drive pressure test, a position test and/or a duration test. Preferably, the control device 4 performs the drive pressure test, the position test and/or the duration test continuously during the partial stroke test.

Preferably, the control device 4 is configured to provide the first safety information in response to the fact that the drive pressure test, the position test and/or the duration test is not passed, and to abort the partial stroke test and, in particular, to switch to normal operation in which the control device 4 performs the closed-loop position control of the valve member 2 on the basis of the externally specified target position. Furthermore, the control device 4 is configured to provide the second safety information and to continue the partial stroke test as long as the drive pressure test, the position test and the duration test are cumulatively fulfilled (and the partial stroke test has not yet been completed), for example in the fifth safety procedure step SP5.

The exemplary sequence of the safety procedure shown in FIG. 4 will be discussed below.

The safety procedure comprises a first safety procedure step SP1, where the safety procedure is started by the control device 4.

The safety procedure further comprises a second safety procedure step SP2, in which the control device 4 performs the drive pressure check. Exemplarily, the drive pressure here represents the pressure information on the basis of which the control device 4 determines the safety information. Exemplarily, in the drive pressure check, the control device 4 checks whether the drive pressure corresponds to a drive pressure specification. In particular, the control device checks in the drive pressure check whether the drive pressure is within a predetermined drive pressure safety range. The drive pressure safety range is defined, for example, by an upper drive pressure threshold and/or by a lower drive pressure threshold. The upper drive pressure threshold and/or the lower drive pressure threshold is expediently spaced apart from a drive pressure required to move (starting from the first position x1) the valve member 2 into the end position—in particular the second end position—lying in the direction of the second position x2. If the drive pressure is outside the drive pressure safety range, the control device 4 provides the first safety information. This takes place in the sixth safety procedure step SP6 as an example.

The safety procedure further comprises the third safety procedure step SP3, in which the control device 4 performs the position check. Exemplarily, in the position check, the control device 4 checks whether the position of the valve member 2 corresponds to a position specification. In particular, the control device 4 checks in the position check whether the position of the valve member 2 is within a predetermined position safety range. In particular, the control device 4 checks whether the valve member 2 is within a waiting position safety range during a waiting time—i.e. during one of the steps S3, S5, S7 explained above—which waiting position safety range is defined around the target position of the valve member 2 applicable at the respective waiting time. In particular, the waiting position safety range represents a tolerance range for the applicable target position of the valve member 2. Expediently, the control device 4 is configured to check whether the valve member 2 is located in a predetermined movement safety range during the first test movement and/or during the second test movement. The movement safety range expediently includes the first position x1 and the second position x2. The movement safety range is expediently different from the waiting position safety range. In particular, the waiting position safety range is to smaller than the movement safety range. In response to the fact that the position of the valve member 2 is outside the position safety range, in particular outside the waiting position safety range and/or outside the movement safety range, the control device 4 provides the first safety information. This is done, for example, by the control device 4 continuing with the sixth safety procedure step SP6.

The safety procedure further comprises the fourth safety procedure step SP4, in which the control device 4 performs the time duration check. Exemplarily, in the time duration check, the control device 4 checks whether a time duration that starts in response to an actuation of the valve device 5 corresponds to a time duration specification. For example, the time duration starts at time t1 and/or at time t4 and ends at time t3 and/or at time t7. Expediently, the time duration ends in response to the fact that the position of the valve member 2 intended by the control of the valve device 5 is reached. Exemplarily, the time duration here represents the temporal quantity on the basis of which the control device 4 determines the safety information. In particular, during the time duration check, the control device 4 checks whether the time duration exceeds a predetermined time duration threshold. The time duration threshold can, for example, be calculated by the control device 4 from a time duration measured during a previously performed reference partial stroke test. Exemplarily, a first duration threshold is defined for the first actuation—in particular for the duration from time t1 to time t3—and/or a second duration threshold is defined for the second actuation—in particular for the duration from time t4 to time t6. During the duration check, the control device checks in particular whether (for the first actuation) the first duration threshold and/or (for the second actuation) the second duration threshold is exceeded.

In response to the time exceeding the duration threshold, in particular the first duration threshold and/or the second duration threshold, the control device 4 provides the first safety information. This is done, for example, by the control device 4 proceeding with the sixth safety procedure step.

By way of example, the control device 4 executes the third safety procedure step SP3 after the second safety procedure step SP2, in particular in response to the drive pressure test being passed. Furthermore, the control device 4 carries out the fourth safety procedure step SP4 after the third safety procedure step SP3, in particular in response to the fact that the position check is passed. Alternatively, the control device 4 can also be designed to perform the safety procedure steps SP2, SP3 and SP4 in a different sequence or simultaneously.

Figure 5:
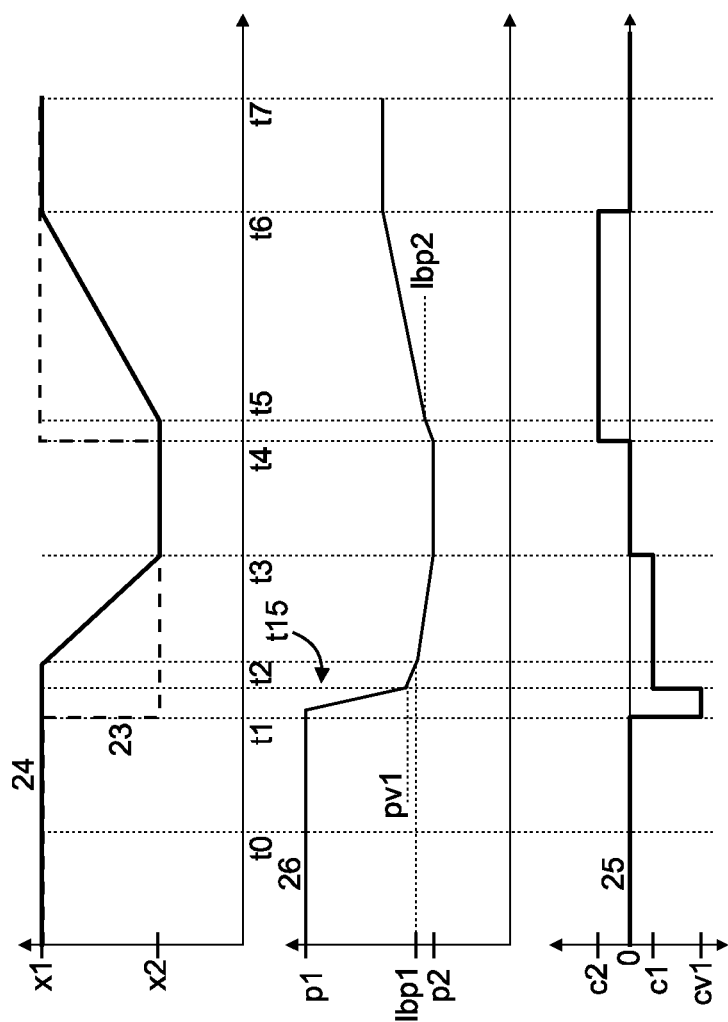
FIG. 5 diagrams of a time sequence of a partial stroke test.

With reference to FIG. 5, an embodiment will be discussed below in which the control device 4 changes the drive pressure to a preparation drive pressure value pv1 prior to the respective test movement, and does so at an increased rate of change in order to thereby shorten the time required until the start of the movement.

The change of the drive pressure to the preparation drive pressure value takes place between the first time t1 and the second time t2, between which (compared to FIG. 2) a further time t15 has been inserted. Otherwise, the partial stroke test shown in FIG. 5 corresponds to the partial stroke test shown in FIG. 2, so that the explanations relating to the partial stroke test in FIG. 2 also apply to the partial stroke test in FIG. 5.

Preferably, the control device 4 is configured to control, during the partial stroke test, the valve device 5 with a first preparation control signal value cv1 prior to the first test movement in order to cause the drive pressure to change at a first preparation change rate towards a first preparation drive pressure value pv1. Further, the control device 4 is configured to control, upon reaching the first preparation drive pressure value pv1, the valve device 5 with a first control signal value c1 to cause the drive pressure to change at a first safety rate of change towards a first breakaway pressure value lbp1 at which the first test movement starts. The magnitude of the first preparation control signal value cv1 is greater than the magnitude of the first control signal value c1, such that the magnitude of the first preparation rate of change is greater than the magnitude of the first safety rate of change.

As shown in FIG. 5, the drive pressure at the beginning of the partial stroke test, i.e. at time to, has the first drive pressure value p1. The first drive pressure value p1 is expediently greater than required to hold the valve member 2 in the first position x1. At time t1, the control device 4 changes the control signal from the control signal value zero to the first preparation control signal value cv1 and keeps the control signal constant at the first preparation control signal value cv1 until time t2, when the drive pressure reaches the preparation drive pressure value pv1. The drive pressure changes from the first time t1 to the second time t2 at the first preparation change rate. The first preparation rate of change is expediently the maximum or the average rate of change of the drive pressure from the first time t1 to the second time t2. At time t2, the control device 4 changes the control signal from the first preparation position signal value cv1 to the first position signal value c1 and keeps the control signal constant at the first position signal value c1 until time t3. The drive pressure changes from the second time t2 to the third time t3 at the first safety change rate. The first safety rate of change is expediently the maximum or the average rate of change of the drive pressure from the second time t2 to the third time t3. The magnitude of the first safety rate of change is less than the magnitude of the first preparation rate of change. From the first time t1 to the third time t3, the drive pressure decreases monotonically, in an exemplary manner, faster before the second time t2 than after the second time t2. The first preparation drive pressure value pv1 is selected such that the valve member 2 still remains in the first position x1 at the first preparatory drive pressure value pv1. For example, the first preparation drive pressure value pv1 is greater than the first breakaway pressure value lbp1.

The first actuation starts exemplarily at the first time t1, in particular by changing the control signal 25 from zero to the first preparation control signal value cv1.

According to an optional embodiment (not shown in the figures), the control device 4 is further configured to control, during the partial stroke test, after the first test movement and before the second test movement, the valve device 5 with a second preparation control signal value to cause the drive pressure to change at a second preparation change rate towards a second preparation drive pressure value, and upon reaching said second preparation drive pressure value, driving said valve device 5 with a second control signal value to cause said drive pressure to change at a second safety change rate toward a second breakaway pressure value lbp2 at which said second test movement begins, wherein the magnitude of said second preparation control signal value is greater than the magnitude of said second control signal value such that the magnitude of said second preparation change rate is greater than the magnitude of said second safety change rate.

Preferably, the control device is configured to determine the first preparation control signal value cv1 and/or the first preparation drive pressure value pv1 and/or the second preparation control signal value cv2 and/or the second preparation drive pressure value pv2 on the basis of a previous actuation of the valve device 5, in particular on the basis of a previous partial stroke test. The previous actuation is in particular a reference partial stroke test.

The control device is expediently configured to determine one or more of the partial stroke test detection values listed below during a previous actuation and to determine the first preparation control signal value cv1 and/or the first preparation drive pressure value pv1 and/or the second preparation control signal value cv2 and/or the second preparation drive pressure value pv2 on the basis of one or more of these partial stroke test detection values: the first drive pressure p1 present at the start of the first actuation of the valve device 5—exemplarily at the first time t1; the change time period from the start of the first actuation of the valve device 5 for the initiation of the first test movement to a first change in the drive pressure caused by the first actuation; the drive pressure change rate from the first change in drive pressure (from the first actuation of the valve device 5) to the start of the first test movement; the first breakaway pressure value; the time period from a stop of the first actuation of the valve device 5 to an end of the first test movement; the second actuation pressure p2 present at the start of the second actuation of the valve device 5—exemplarily at the fourth time t4; the change time period from the start of the second actuation of the valve device 5 for the initiation of the second test movement to a second change of the actuation pressure caused by the second actuation; the drive pressure change rate from the second change in drive pressure (from the second actuation of the valve device 5) to the start of the second test movement; the second breakaway pressure value; the time period from a stop of the second actuation of the valve device 5 to an end of the second test movement.

Preferably, the control device 4 is configured to detect one, several or all of the listed partial stroke test detection values during the partial stroke test, in particular during each partial stroke test, and to use them expediently for parameterization of the respective next partial stroke test.

Exemplarily, the control device 4 is configured to calculate, from one, several or all of the listed partial stroke test detection values, the first preparation control signal value cv1 and/or the second preparation control signal value cv2 in particular taking into account a cycle time of a measuring and/or control loop of the control device and/or using further characteristic data. The further characteristic data are, for example, parameters that were determined as part of a model identification that was carried out in advance; these include, for example, the dead volumes of the one or more pressure chambers.

Preferably, the control device 4 is configured to check whether, after the valve device 5 has been actuated with the first preparation control signal value cv1 and in particular before the preparation pressure value pv1 is reached and/or before a (stored) first breakaway pressure value lbp1 is reached, a flattening of the change in the drive pressure and/or a change in the position of the valve member 2, in particular in the direction of the second position x2, and, if this is the case, to abort the actuation with the first preparation control signal value cv1, in particular to abort the partial stroke test.

Optionally, the control device 4 is configured to detect play between the valve drive 3 and the process fitting 1 and to take the detected play into account when providing the pressure information and/or the status information. Preferably, the control device 4 is configured to detect the play based on a time course of the position and/or speed of the drive element 13 and/or based on a time course of the drive pressure. Play means that the valve member 2 is movable relative to the drive element 13, namely in the direction of the drive movement provided by the drive element 13. This results in a range—hereinafter also referred to as play range—in which the drive element 13 performs its drive movement, but the valve member 2 is—due to the play—not yet moved along, but remains in its current position. The play range is in particular a linear and/or rotational positional range in which the drive element 13 and the valve member 2 can be moved independently of each other in the drive direction. Only after the relative position of the drive element 13 to the valve member 2 leaves the play range is the valve member 2 carried along by the drive element 13, i.e. driven by it.

In particular, the control device 4 is configured to take the detected backlash into account when detecting the first breakaway pressure value lbp1 and/or the second breakaway pressure value lbp2. Furthermore, the control device 4 is expediently configured to take the detected play into account when calculating the first preparation control signal value cv1 and/or the first preparation drive pressure value pv1 and/or the second preparation control signal value cv2 and/or the second preparation drive pressure value pv2. By taking the detected play into account, an underestimation of the detected breakaway pressure values can be prevented. When calculating the preparation control signal value and/or the preparation drive pressure value, the breakaway pressure of the drive element 13 is expediently used to ensure that the preparation control signal value causes the valve member 2 to break away.

Preferably, the process valve apparatus 10 is configured to provide a warning signal based on the pressure information.

Expediently, the state information comprises a state value and the control device is configured to estimate, on the basis of at least two partial stroke tests, a point in time at which the state value reaches a threshold value. In particular, the state value is a quantity from which a functional state of the process valve apparatus 10 can be inferred. For example, the state value is one of the partial stroke test detection values.

In particular, the process valve apparatus 10 is configured to output a message in response to the time duration reaching a time duration threshold. In particular, the message can indicate activities for maintenance of the process valve apparatus 10, in particular the process fitting 1, the valve drive 3 and/or the control device 4. Preferably, the process valve apparatus 10 is configured to output the message under the condition that one or more basic conditions are met, for example that a sufficiently low uncertainty of an estimate is given.

For example, the control device 4 is configured to detect, during several, in particular successive partial stroke tests, one or more partial stroke test detection values, for example the minimum drive pressure, maximum drive pressure, first breakaway pressure value lbp1 and/or second breakaway pressure value, and/or optionally the first change time period, the second change time period, the first drive pressure change rate and/or the second drive pressure change rate. In particular, the control device 4 is designed to perform the partial stroke tests on a regular basis. Between two successive partial stroke tests there are expediently at least several days or at least one week.

Expediently, the process valve apparatus 10, in particular the cloud server 40, the higher-level controller 30, and/or the control device 4 is configured to store one, more, or all of the partial stroke test detection values detected during the partial stroke tests, respectively.

For example, the process valve apparatus 10 is configured to calculate, based on partial stroke test detection values from multiple partial stroke tests, estimated values for future partial stroke test detection values, in particular based on one or more models and/or including calculation of associated estimation uncertainties. Preferably, the process valve apparatus 10 calculates the estimated values by extrapolation.

In particular, the process valve apparatus 10 is configured to estimate, on the basis of the partial stroke test detection values and/or the estimated values, a future point in time at which at least one of the partial stroke test detection values lies in a range at which there is no longer sufficient mobility of the drive element 13 and/or the valve member 2.

For example, the process valve apparatus 10 is configured to calculate a future time at which a pressure difference associated with pneumatic actuation of the valve drive 3—for example, the drive pressure—is greater than a difference between an ambient pressure and a supply pressure of the process valve assembly unit 20. The process valve apparatus 10 is optionally configured to display a warning that at this time it must be expected that the valve member 2 can no longer be moved out of the first position x1.

Furthermore, the process valve apparatus 10 is configured, for example, to calculate a future point in time at which the change time period exceeds a threshold value. The process valve apparatus 10 is optionally configured to display a warning that at this point in time it must be expected that the valve device, in particular a pneumatic valve of the valve device, will no longer respond sufficiently to an actuation.

Furthermore, the process valve apparatus 10 is configured, for example, to calculate a future point in time at which the first drive pressure change rate and/or the second drive pressure change rate is smaller than a threshold value and, for example, is close to zero. The process valve apparatus 10 is optionally configured to display a warning that the valve device, in particular a pneumatic valve of the valve device, will, at this point in time, no longer achieve a required degree of opening when actuated.

In particular, the process valve apparatus 10 is configured to indicate the calculated time as a failure time, in particular including a calculated uncertainty value.

What is claimed is:

1. A process valve apparatus comprising:
a process fitting with a valve member;
a pneumatic valve drive for actuating the valve member; and
a control device with a control device housing, a control unit and a pneumatic valve device for pneumatic actuation of the valve drive, wherein the control unit and the pneumatic valve device are arranged in the control device housing and the control unit is configured to provide an electrical control signal for controlling the pneumatic valve device, the control device being configured to carry out a partial stroke test and, within the partial stroke test:
to pneumatically actuate the valve drive by means of the valve device, so that the valve drive sets the valve member in a test movement sequence in which the valve member performs a first test movement from a first position to a second position and a second test movement from the second position back to the first position,
to detect pressure information related to the pneumatic actuation of the valve drive and, taking the pressure information into account, to determine status information indicating the functioning and/or wear of the process valve apparatus,
wherein the control unit is configured to control the valve device with the electrical control signal in order to effect the pneumatic actuation of the valve drive, wherein the control device is configured to perform a plurality of partial stroke tests and the control unit is configured to provide the electrical control signal with the same control signal values for each partial stroke test.

2. The process valve apparatus according to claim 1, wherein the control device is further configured to determine, in addition to the status information, safety information indicating whether it is safe to perform the partial stroke test.

3. The process valve apparatus according to claim 2, wherein the control device is configured to abort the partial stroke test in response to the safety information indicating that it is not safe to perform the partial stroke test.

4. The process valve apparatus according to claim 2, wherein the control device is configured to determine the safety information on the basis of the pressure information and/or on the basis of a temporal quantity related to the test movement sequence of the valve member.

5. The process valve apparatus according to claim 1, wherein the pressure information comprises a breakaway pressure value, a maximum drive pressure value and/or a minimum drive pressure value of the valve drive.

6. The process valve apparatus according to claim 1, wherein the control device is configured to set the electrical control signal to a constant first control signal value during the entire first test movement of the valve member and/or to set the electrical control signal to a constant second control signal value during the entire second test movement of the valve member.

7. The process valve apparatus according to claim 1, wherein the control device is adapted to perform a control signal value determination procedure and, as part of the control signal value determination procedure, to detect a movement parameter of the valve member and to determine control signal values of the control signal to be used for the partial stroke test based on the movement parameter.

8. The process valve apparatus according to claim 1, wherein the control device is configured to detect play between the valve drive and the process fitting and to take the detected play into account when providing the pressure information and/or the status information.

9. The process valve apparatus according to claim 1, wherein the control device is configured to determine, on the basis of prior actuation, a control signal value which, at the start of the partial stroke test, causes the valve member to move out of the first position only after a predetermined number of detection cycles in which the pressure information is detected.

10. The process valve apparatus according to claim 1, wherein the control device is configured to provide a warning signal on the basis of the pressure information.

11. The process valve apparatus according to claim 1, wherein the status information comprises a state value and the process valve apparatus is configured to estimate a time at which the state value reaches a threshold value based on at least two partial stroke tests.

12. The process valve apparatus according to claim 11, wherein the process valve apparatus is configured to output a message in response to a time duration to the time reaching a time duration threshold.

13. A method of operating a process valve apparatus according to claim 1, the method comprising the steps of:
performing the partial stroke test, and, within the partial stroke test:
pneumatically actuating the valve drive so that the valve drive moves the valve member in the test movement sequence,
acquiring the pressure information and, taking the pressure information into account, determining the status information.

14. The process valve apparatus according to claim 1, wherein the valve device comprises a valve device opening for supplying compressed air to a pressure chamber of the pneumatic valve drive, wherein each control signal value of the electrical control signal specifies a degree of opening of the valve device opening.

15. A process valve apparatus comprising:
a process fitting with a valve member;
a pneumatic valve drive for actuating the valve member; and
a control device with a pneumatic valve device for pneumatic actuation of the valve drive, the control device being configured to carry out a partial stroke test and, within the partial stroke test:
to pneumatically actuate the valve drive by means of the valve device, so that the valve drive sets the valve member in a test movement sequence in which the valve member performs a first test movement from a first position to a second position and a second test movement from the second position back to the first position,
to detect pressure information related to the pneumatic actuation of the valve drive and, taking the pressure information into account, to determine status information indicating the functioning and/or wear of the process valve apparatus,
wherein the control device is configured to control the valve device, in the partial stroke test prior to the first test movement, with a first preparation control signal value to cause the drive pressure to change at a first preparation rate of change toward a first preparation drive pressure value, and upon reaching the first preparation drive pressure value, to control the valve device with a first control signal value, to cause the drive pressure to change at a first safety rate of change toward a first breakaway pressure value at which the first test movement begins, wherein the magnitude of the first preparatory control signal value is greater than the magnitude of the first control signal value such that the magnitude of the preparatory rate of change is greater than the magnitude of the safety rate of change.

16. The process valve apparatus according to claim 15, wherein the control device is configured to determine the first preparation control signal value and/or the first preparation drive pressure value on the basis of a previous actuation of the valve device.

17. The process valve apparatus according to claim 15, wherein the control device is configured to determine the first preparation control signal value and/or the first preparation drive pressure value on the basis of a previous partial stroke test.

* * * * *